UNITED STATES PATENT OFFICE.

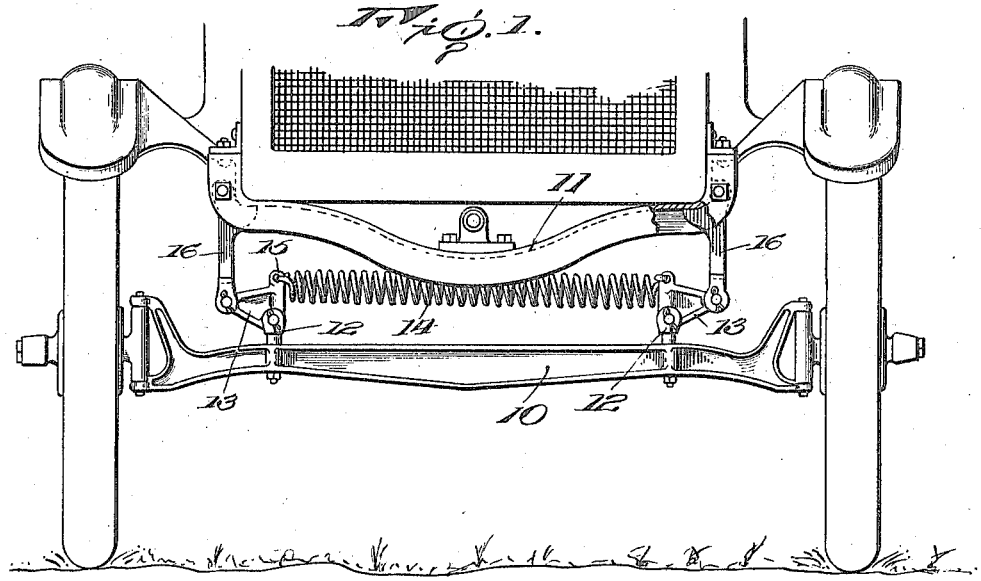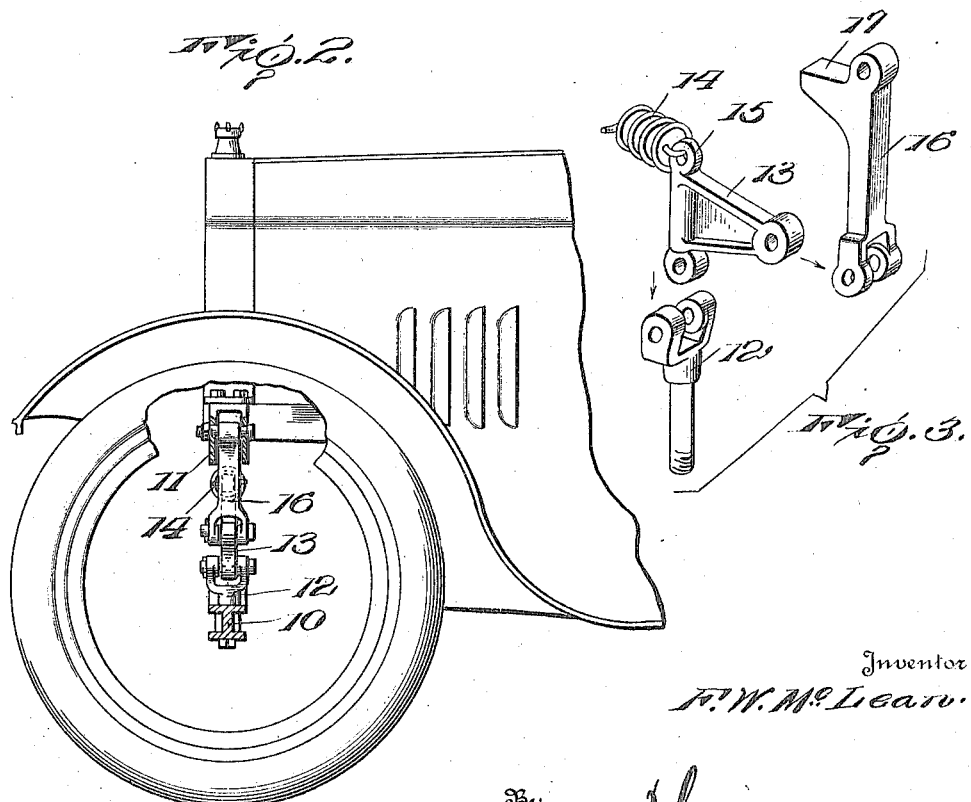

FRANK W. McLEAN, OF SHREVEPORT, LOUISIANA.

VEHICLE-SPRING.

1,263,782.  Specification of Letters Patent.  Patented Apr. 23, 1918.

Application filed August 29, 1917. Serial No. 188,800.

*To all whom it may concern:*

Be it known that I, FRANK W. McLEAN, a citizen of the United States, residing at Shreveport, in the parish of Caddo and State of Louisiana, have invented certain new and useful Improvements in Vehicle-Springs, of which the following is a specification.

This invention relates to an improved vehicle spring and has as its primary object to provide a construction employing pivoted load supporting levers arranged to act upon a cushioning spring extending therebetween for cushioning the load.

The invention has as a further object to provide an arrangement wherein the cushioning spring will so connect the pivoted load supporting levers that the load will be distributed between the said levers to the spring.

And the invention has as a still further object to provide a construction of spring which may be used upon substantially any conventional type of motor vehicle.

Other and incidental objects will appear as the description proceeds and in the drawings wherein I have illustrated the preferred embodiment of the invention and wherein similar reference characters designate corresponding parts throughout the several views:

Figure 1 is a fragmentary front elevation showing my improved spring applied to a conventional type of motor vehicle, Fig. 2 is a fragmentary sectional view particularly showing the mounting of the spring upon the front axle of the vehicle, and Fig. 3 is a detail perspective view showing one of the load supporting levers of the vehicle detached.

In order that the construction, mounting and operation of my improved vehicle spring may be accurately understood, I have, in the drawings, shown the device in connection with a conventional type of motor vehicle having a front axle 10 above which is arranged a downwardly bowed yoke 11 connected with the vehicle chassis at its forward extremity. Secured to the axle at longitudinally spaced points thereon, are brackets 12. In carrying out the invention, I employ load supporting levers 13 pivotally connected to the upper terminals of the brackets 12 by bolts or other suitable fastening devices. One of these levers is shown in detail in Fig. 3 of the drawings and it will be noted that the said levers are each in the nature of a triangular shaped block and are mounted upon the brackets 12 with the short sides thereof presented toward each other. Extending between the upper terminals of the said levers at their inner extremities is a load cushioning spring or element 14. This spring is preferably of helical form and the terminals thereof are loosely fitted through suitable upstanding ears or lugs 15 upon the levers for connecting the said spring thereto.

Pivotally connected to the outer ends of the levers 13 are suitable links 16 the upper terminals of which are pivotally connected to the extremities of the yoke 11, as particularly shown in Fig. 3, and are provided with laterally and inwardly directed lugs 17 fitting between the sides of the said yoke. The lugs will therefore coact with the yoke to hold the vehicle body against lateral movement.

As will now be seen, the load of the vehicle body will be communicated through the links 16 to the levers 13 which will be held to support the load by the cushioning spring 14. Therefore, downward movement of the vehicle body will tend to swing the outer ends of the levers 13 downwardly and expand the spring 14 so that this spring will thus act to effectually cushion the load. Moreover, since the said spring is arranged to connect the load supporting levers, the load upon the cushioning spring will be equally distributed between the said levers. Lateral movement of the spring will be prevented by the yoke 11 which receives the intermediate portion of the spring between the sides thereof.

I therefore provide a particularly simple construction for the purpose set forth while at the same time, the spring will prove thoroughly efficient in use. Furthermore, the spring is of such nature that it may be readily employed in connection with substantially any conventional type of motor vehicle.

Having thus described the invention, what is claimed as new is:

1. A vehicle spring including coacting load supporting levers pivotally mounted upon an axle of the vehicle, yieldable cushioning means extending between the said levers, links pivotally connected with the outer extremities of the levers to swing in a plane parallel to the axle and engaged with the body of the vehicle to support the vehicle body from the said levers, and means carried by the said links to operatively coact with the vehicle body for holding the body against lateral movement upon the links.

2. A vehicle spring including coacting load supporting levers pivotally mounted upon an axle of the vehicle, cushinoning means extending between the said levers, means connecting the outer extremities of the levers with the body of the vehicle to support the vehicle body upon the said levers, and means carried by the said connecting means to operatively coact with the vehicle body for holding the said body against lateral movement upon the said connecting means.

3. A vehicle spring including coacting load supporting levers pivotally mounted upon an axle of the vehicle, yieldable cushioning means for the said levers, links pivotally connected to the said levers and swingingly engaged with the vehicle body for supporting the body upon the levers, and shoulders carried by said links to operatively coact with the vehicle body for holding said body against lateral movement upon the links.

4. A vehicle spring including coacting load supporting levers pivotally mounted upon an axle of the vehicle, yieldable cushioning means for the said levers, links pivotally connected to the levers and swingingly engaged with the vehicle body for supporting the body upon the said levers, the said links being mounted to swing in a plane parallel to the said axle, and shoulders formed on the said links adjacent their upper extremities and projecting therebetween for engagement with the vehicle body for holding the said body against lateral movement upon the said links.

5. The combination with a channeled vehicle body yoke, of a spring for the vehicle including coacting load supporting levers pivotally mounted upon an axle of the vehicle, yieldable cushioning means for the said levers, links pivotally engaged with the levers and swingingly mounted within the channel of said yoke for supporting the vehicle body upon the levers, and shoulders carried by the said links to engage within the channel of the yoke for holding the vehicle body against lateral movement upon the said links.

In testimony whereof I affix my signature.

FRANK W. McLEAN. [L. S.]

Copies of this patent may be obtained for five cents each, by addressing the "Commissioner of Patents, Washington, D. C."